(12) United States Patent
Rodoni

(10) Patent No.: US 11,574,289 B2
(45) Date of Patent: *Feb. 7, 2023

(54) SYSTEM FOR MANAGING UTILITY AND WASTE SERVICES

(71) Applicant: Rubicon Technologies, LLC, Lexington, KY (US)

(72) Inventor: Philip Rodoni, Decatur, GA (US)

(73) Assignee: Rubicon Technologies, LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,896

(22) Filed: Oct. 27, 2020

(65) Prior Publication Data

US 2021/0042711 A1 Feb. 11, 2021

Related U.S. Application Data

(63) Continuation of application No. 15/635,769, filed on Jun. 28, 2017, now Pat. No. 10,817,850.

(51) Int. Cl.
*G06Q 10/00* (2012.01)
*G06Q 30/04* (2012.01)
(Continued)

(52) U.S. Cl.
CPC .............. *G06Q 10/30* (2013.01); *B65F 3/02* (2013.01); *G06Q 20/14* (2013.01); *G06Q 20/145* (2013.01);
(Continued)

(58) Field of Classification Search
None
See application file for complete search history.

(56) References Cited

U.S. PATENT DOCUMENTS 9,363,219 B2 6/2016 Campbell et al.
10,332,197 B2 6/2019 Kekalainen et al.
(Continued)

FOREIGN PATENT DOCUMENTS

JP 4300073 B2 7/2009
JP 4668968 B2 4/2011
(Continued)

OTHER PUBLICATIONS

Warming, Lena. Innovative meter reading with a Danish Touch. Kamstrup. Journal No. 1/2008 (Year: 2008).*
(Continued)

*Primary Examiner* — Scott A Zare
(74) *Attorney, Agent, or Firm* — Kilpatrick Townsend & Stockton, LLP; Michael Morlock

(57) ABSTRACT

A system is disclosed for managing services at a customer location. The system may have at least one offboard utility meter, a communication device, and a controller in communication with the at least one offboard utility meter via the communication device. The controller may be configured to receive information from the at least one offboard utility meter during a waste service activity at the customer location by a waste service vehicle and to determine based on the information from the at least one offboard utility meter a fee associated with at least one utility service provided at the customer location. The controller may also be configured to generate at least one invoice for the waste service activity and for the fee associated with the at least one utility service.

20 Claims, 3 Drawing Sheets

(51) Int. Cl.
*G06Q 20/14* (2012.01)
*G06Q 50/26* (2012.01)
*B65F 3/02* (2006.01)
*G08B 21/04* (2006.01)

(52) U.S. Cl.
CPC ......... *G06Q 30/04* (2013.01); *G08B 21/0484*
(2013.01); *B65F 2210/128* (2013.01); *B65F 2210/138* (2013.01); *G06Q 50/26* (2013.01)

(56) References Cited

U.S. PATENT DOCUMENTS

| | | | | |
|---|---|---|---|---|
| 2005/0110656 | A1* | 5/2005 | Patterson | G01D 4/008 340/870.02 |
| 2006/0022841 | A1* | 2/2006 | Hoiness | H04Q 9/00 340/870.02 |
| 2013/0132244 | A1* | 5/2013 | Jenkins | G06Q 30/04 705/30 |
| 2014/0203933 | A1 | 7/2014 | Wang et al. | |
| 2014/0320306 | A1* | 10/2014 | Winter | G01D 4/004 340/870.02 |
| 2015/0211886 | A1* | 7/2015 | Balzano | H04Q 9/00 340/870.02 |
| 2017/0032432 | A1 | 2/2017 | Kaufmann et al. | |
| 2018/0158033 | A1 | 6/2018 | Woods et al. | |
| 2018/0365957 | A1* | 12/2018 | Wright | G08B 21/043 |

FOREIGN PATENT DOCUMENTS

| | | |
|---|---|---|
| JP | 5106337 B2 | 12/2012 |
| JP | 5192280 B2 | 5/2013 |
| JP | 5259323 B2 | 8/2013 |
| JP | 5627916 B2 | 11/2014 |
| JP | 6103552 B2 | 3/2017 |
| JP | 6399324 B1 | 10/2018 |
| JP | 6438407 B2 | 12/2018 |
| JP | 2019156566 A | 9/2019 |
| JP | 6651105 B1 | 2/2020 |
| JP | 6651106 B1 | 2/2020 |
| JP | 2020019639 A | 2/2020 |
| JP | 2020087134 A | 6/2020 |
| JP | 6740731 B2 | 8/2020 |
| JP | 2020160979 A | 10/2020 |
| JP | 6785513 B2 | 11/2020 |
| JP | 2020194213 A | 12/2020 |
| JP | 2021033833 A | 3/2021 |
| JP | 2021077112 A | 5/2021 |
| JP | 6924728 B2 | 8/2021 |
| JP | 2021140452 A | 9/2021 |
| JP | 2021156580 A | 10/2021 |
| JP | 2021156581 A | 10/2021 |
| WO | 2007118221 A2 | 10/2007 |

OTHER PUBLICATIONS

PCT/US2018/040157, "International Search Report and the Written Opinion", dated Sep. 14, 2018, 8 pages.

* cited by examiner

SYSTEM FOR MANAGING UTILITY AND WASTE SERVICES

TECHNICAL FIELD

The present disclosure relates generally to a management system and, more particularly, to a system for managing utility and waste services.

BACKGROUND

Residential waste service providers typically dispatch service vehicles to customer properties according to a pre-determined pickup route assigned to each service vehicle. The pickup route for each service vehicle is often designed to provide waste services (e.g., emptying waste receptacles) within a particular geographical area (e.g., a subdivision) and at a particular frequency (e.g., once per week). For example, a particular service vehicle may be tasked to service several hundred waste receptacles at closely-spaced residences within a particular subdivision on a Tuesday every week. After completion of the waste services within that subdivision, the service vehicle operator may report the completion to a back office, which updates the operator's route and an account record for each customer. Customers in the subdivision that subscribe to these waste services are then billed based on the account record.

In addition to receiving waste services, most customers also receive services from one or more utility companies. For example, a customer may receive power from a power company, water from a water company, fuel (e.g., natural gas or heating oil) from a fuel provider, internet service from an internet provider, phone service from a phone service provider, etc. Similar to the waste service described above, the customer is generally billed on a monthly basis by each provider for the corresponding services rendered.

Although the conventional system of multiple service providers generating separate and independent bills may be acceptable in some scenarios, it can also be problematic. For example, it can be cumbersome and difficult for a customer to separately process each bill, and expensive and time consuming for the utility companies to generate the bills and manage the accounts. In addition, it can be burdensome for the customer to arrange for special conditions and/or schedule irregularities (e.g., increases or decreases in customer needs, service interruptions due to vacations, etc.) with each of the different companies.

The disclosed system and method are directed to overcoming one or more of the problems set forth above and/or other problems of the prior art.

SUMMARY

In one aspect, the present disclosure is directed to a system for managing services at a customer location. The system may include at least one offboard utility meter, a communication device, and a controller in communication with the at least one offboard utility meter via the communication device. The controller may be configured to receive information from the at least one offboard utility meter during a waste service activity at the customer location by a waste service vehicle and to determine based on the information from the at least one offboard utility meter a fee associated with at least one utility service provided at the customer location. The controller may also be configured to generate at least one invoice for the waste service activity and for the fee associated with the at least one utility service.

In another aspect, the present disclosure is directed to a method for managing services at a customer location. The method may include, during a waste service activity performed by a waste service vehicle at the customer location, wirelessly receiving information about at least one utility service provided at the customer location. The method may also include determining based on the information about the at least one utility service a fee associated with the at least one utility service, and generating at least one invoice for the waste service activity and for the fee associated with the at least one utility service.

In yet another aspect, the present disclosure is directed to a non-transitory computer readable medium containing computer-executable programming instructions for performing a method of service management at a customer location. The method may include, during a waste service activity performed by a waste service vehicle at the customer location, wirelessly receiving onboard the waste service vehicle at least one of a level of utility consumption at the customer location, an amount remaining of a particular necessity at the customer location, and a current utility consumption setting associated with a plurality of utility services provided at the customer location. The method may also include determining a fee associated with the plurality of utility services, and generating at least one invoice for the waste service activity and for the fee associated with the plurality of utility services. The method may further include receiving electronic payment for the at least one invoice, and selectively distributing the payment to a plurality of providers corresponding with the plurality of utility services.

DETAILED DESCRIPTION

Figure 1:
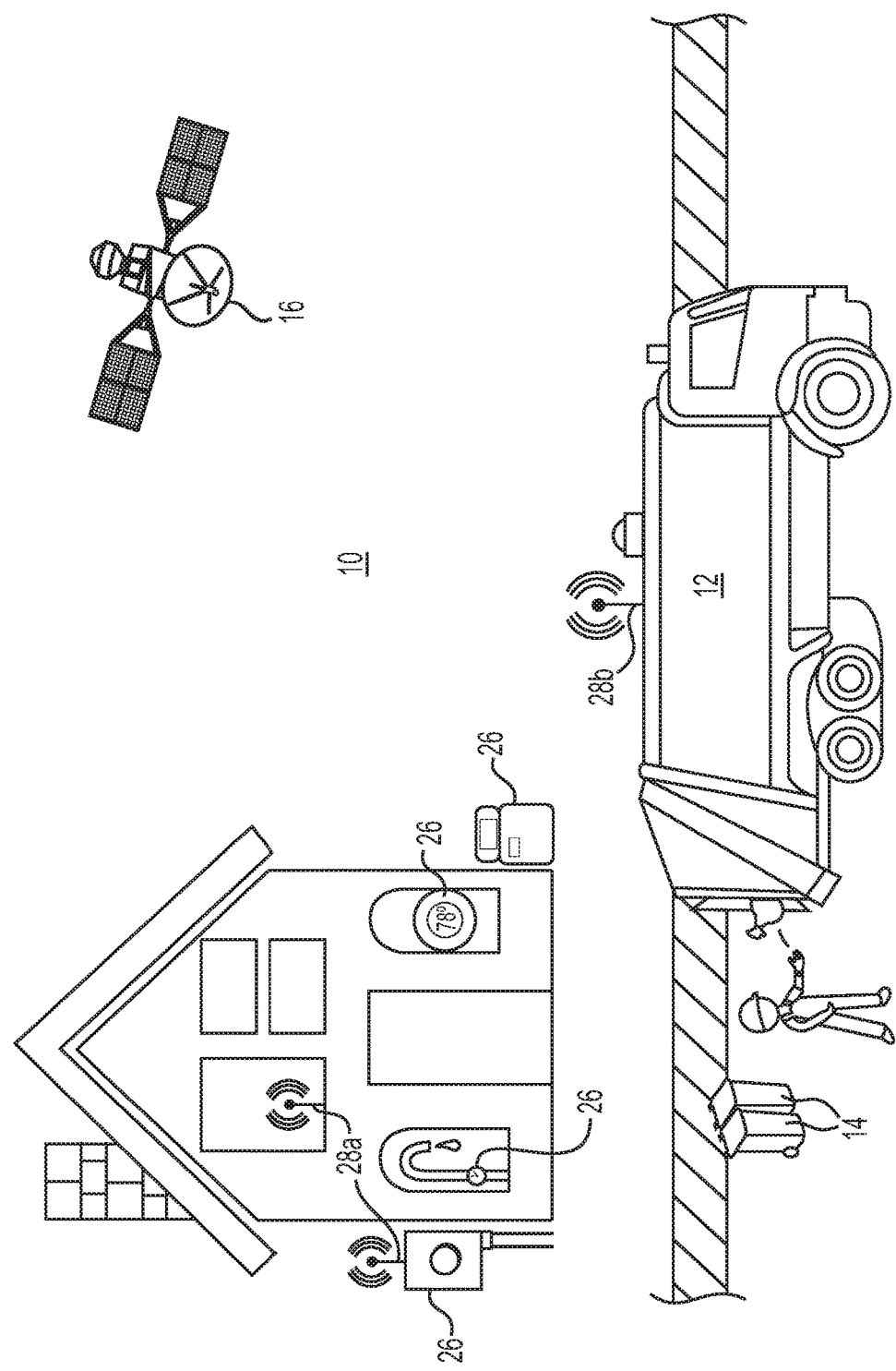
FIG. 1 is a perspective illustration of an exemplary disclosed waste management environment.

FIG. 1 illustrates an exemplary waste management environment ("environment") 10, at which one or more service vehicles 12 are providing waste services. Environment 10 may include any number of retail stores, factories, government buildings, residential addresses, or other locations having one or more receptacles 14 that require the service of vehicle 12. The service may include, for example, the removal of waste materials from inside of receptacle 14, the replacement of receptacle 14, and/or the placement of new or additional receptacles 14.

Vehicle 12 may embody a haul truck (and/or a trailer that is attachable to the haul truck), which includes or otherwise carries a storage compartment for holding waste materials. As is known in the art, the storage compartment may have a rear, side, and/or top hatch for receiving materials from receptacles 14, and the waste materials may be manually, automatically, or semi-automatically loaded into the storage compartment of a particular vehicle 12 via the corresponding hatch. For example, management personnel may be able to manually empty receptacles 14 into the storage compartment of a rear-hatch vehicle 12. In another example, vehicles 12 may include mechanical, electrical, and/or hydraulic systems configured to automatically grasp, lift, tilt, shake, and thereby empty receptacles 14 into vehicle 12 via a top-hatch. In yet another example, some tasks (e.g., grasping) may be completed manually and other tasks (e.g., lifting, tilting, and shaking) may be completed with the assistance of the mechanical, electrical, and/or hydraulic systems via a side-hatch of vehicle 12. In a final example, receptacle 14 may simply be loaded (e.g., manually, automatically, or semi-automatically) together with the waste contents onto vehicle 12 and transported away for emptying at another location.

As each vehicle 12 services receptacles 14 within environment 10, the motions of vehicle 12 may be monitored. For example, a satellite 16 or other tracking device may communicate with a controller 18 (shown only in FIG. 2) to monitor the movements of vehicle 12 and the associated changes made to environment 10 (e.g., pickup, transporting, dumping, placing, etc.). As will be explained in more detail below, controller 18 may facilitate management of service activities performed within environment 10.

Controller 18 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. In some embodiments, controller 18 may be carried by the operator of service vehicle 12. For example, controller 18 could be embodied as a smartphone, tablet, or other personal computing device.

Figure 2:
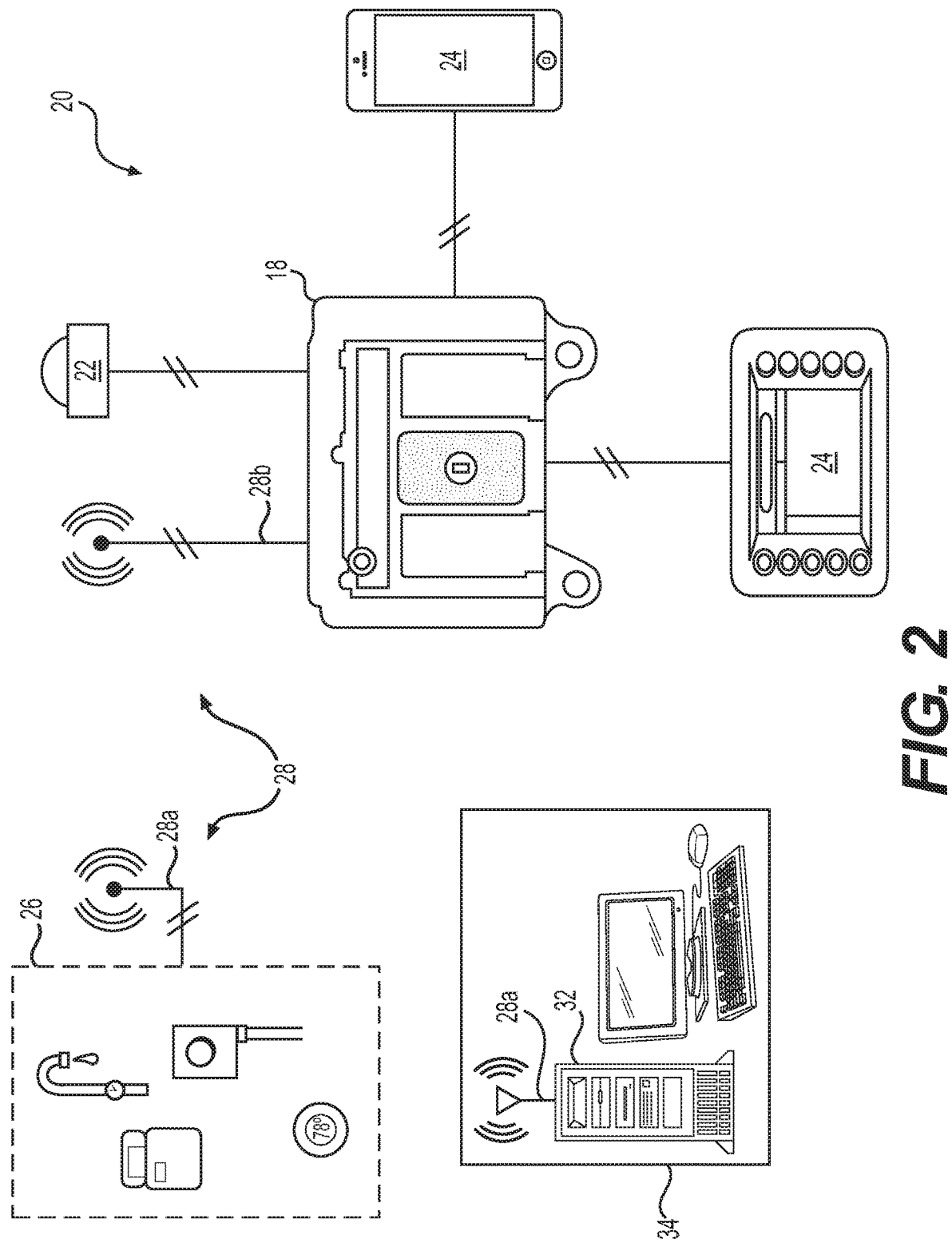
FIG. 2 is a diagrammatic illustration of an exemplary disclosed system that may be used to manage the environment of FIG. 1.

As shown in FIG. 2, controller 18 may form a portion of a management system ("system") 20 that is configured to track, assist, and/or control movements of service vehicle(s) 12 (shown only in FIG. 1) and/or other utilities at a customer location. In addition to controller 18, system 20 may also include at least one locating device 22 positioned onboard each service vehicle 12, at least one input device 24 positioned onboard each service vehicle 12, and at least one offboard utility meter 26 positioned offboard service vehicle 12 (e.g., at the customer location). Controller 18 may be in communication with each of these other components and configured to determine, based on signals from these components and based on other known information stored in memory, the location of each service vehicle 12, characteristics and locations of receptacles 14 being moved by and/or in a vicinity of each service vehicle 12, and information associated with other utility services being provided at the customer location.

In one embodiment, locating device 22 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 22 may embody an electronic receiver configured to communicate with satellites 16 (referring to FIG. 1), or a local radio or laser transmitting system used to determine a relative geographical location of itself. Locating device 22 may receive and analyze high-frequency, low-power radio or laser signals from multiple locations to triangulate a relative 3-D geographical position and orientation. Based on the signals generated by locating device 22 and based on known kinematics of service vehicle 12, controller 18 may be able to determine in real or near real time, the position, heading, travel speed, acceleration, and orientation of service vehicle 12. This information may then be used by controller 18 to update the locations and conditions of service vehicle(s) 12 and/or receptacles 14 in an electronic map or database of environment 10.

Input device 24 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about receptacle 14 and the waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In addition to receiving manual input from an operator, input device 24 may also be capable of displaying information, for example the electronic map of environment 10, instructions, scheduling, routing, receptacle information (e.g., ID, configuration, location, weight, etc.), payload information (e.g., weight and/or volume), etc.

In some embodiments, input device 24 may be configured to execute an application. For example, when input device 24 is a mobile device (e.g., a smartphone), the application can be a mobile app ("app"). An app is an abbreviated term for a "software application", which is downloadable to, and executable by, a mobile device (e.g., a laptop, a smart phone, or a tablet). The disclosed management app can provide a graphical user interface (GUI) configured to display information about a waste or utility service to the operator of service vehicle 12, to receive input from the operator regarding a completed or incomplete service activity, to transmit the operational data to controller 18, to receive and display information about a current operation or setting, etc.

Any number of utility meters 26 may be positioned (e.g., temporarily or permanently) offboard at a particular customer location. In the example of FIGS. 1 and 2, a water meter, a gas meter, an electricity meter, and a thermostat are shown. It is contemplated, however, that additional and/or different utility meters 26 could be utilized at the same customer location. Each utility meter 26 may be an electronic device that is configured to track, record, and/or regulate consumption of an everyday necessity (e.g., water, sewer, electricity, natural gas, telephone service, internet service, and other essentials).

In some embodiments, utility meter 26 may be capable of communication (e.g., 1-way or 2-way communication) with controller 18, for example via a communication device 28. The communication may include, among other things, a level of utility consumption, an amount remaining of a particular necessity, a current consumption setting (e.g., a temperature, a lighting level, etc.), a commanded setting, an alert, etc. Utility meter(s) 26 may be configured to communicate with controller 18 during a waste service activity (e.g., during lifting, shaking, tilting, and/or dumping of emptying of receptacle 14; during placement of a new receptacle 14; during retrieval of waste not in receptacle 14; and/or during another waste-related activity) performed by service vehicle 12 at the customer location. This communication may be initiated, for example, based on a detected proximity of service vehicle 12 to the customer location and/or based on a signal transmitted by controller 18 upon detected arrival at the location, a detected start of a service event, or a manual input received via input device 24.

In one example, communication device 28 includes an onboard component (e.g., an electronic transmitter and/or receiver) 28b, and at least one offboard component (e.g., an electronic transmitter and/or receiver) 28a. These components may include hardware (e.g., I/O devices, a display, a processor, a memory, etc.) and/or software (e.g., an operating system, communication software, an app, etc.) necessary to facilitate wireless communication. This communication could be based on one or more wireless proprietary protocol, such as NFC, Bluetooth, Wi-Fi (e.g., 802.11), cellular signals (e.g., GSM, CDMA, and LTE), satellite, etc. It is contemplated that a single offboard component 28a could be networked with multiple utility meters 26 and function as a hub for communication with onboard component 28b. Alternatively, each utility meter 26 could include a dedicated offboard component 28a for separate communication with onboard component 28b, as desired.

Controller 18 may receive and analyze signals from offboard component 28a (e.g., via onboard component 28b), and responsively determine a unique identification of the customer location (e.g., the owner's name, address, and/or account number) at which service is being performed. In some embodiments, controller 18 may be able to determine the owner's name, address, and/or account number based on a strength of signals generated by offboard component 28a in connection with signals generated by locating device 22 and known accounts associated with particular locations. This information may then be linked by controller 18 to service-related information (e.g., information associated with waste services provided by service vehicle 12 and/or other utility services tracked, recorded, and/or regulated by utility meter(s) 26). Controller 18 may also filter the signals, buffer the signals, record the signals, or otherwise condition the signals received from the other onboard and/or offboard components.

Controller 18, based on the information received from the other devices located onboard and offboard service vehicle 12, may be configured to execute instructions stored in computer readable medium to perform methods of utility management at environment 10. For example, controller 18 may be configured to determine when service vehicle 12 is close to a customer location at which waste services are to be performed, detect performance of the waste services, and create a record of the performance that is stored in the memory of controller 18. In addition, while service vehicle 12 is at the customer location, controller 18 may communicate with offboard components (e.g., utility meter(s) 26) at the customer location, receive consumption information from the components, provide control commands to the components, and/or pass the consumption information on to the corresponding utility companies. In some embodiments, controller 18 may also be configured to communicate with an offboard controller 32 (e.g., a controller located at a back office 34), and report the consumption and/or control information to the back office 34. This information may then be used to generate billing, update account records, make changes to account settings, etc.

Figure 3:
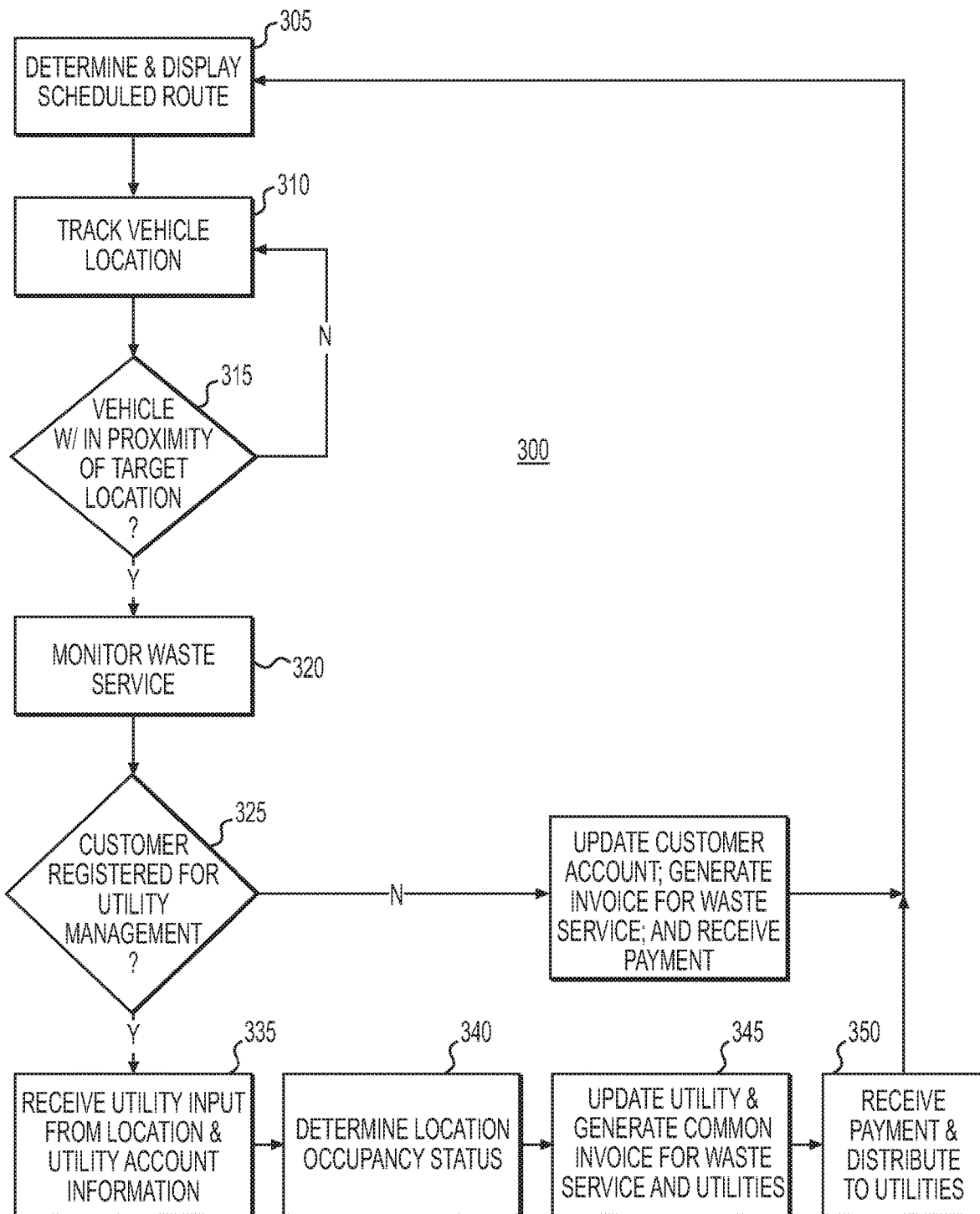
FIG. 3 is a flowchart illustrating an exemplary disclosed method of managing waste services that may be performed by the system of FIG. 2.

An exemplary management process that may be performed by controller 18 (and/or controller 32) is illustrated in FIG. 3. FIG. 3 will be explained in more detail in the following section to further illustrate the disclosed concepts.

INDUSTRIAL APPLICABILITY

The disclosed system, method, and app may be applicable to the service industry, where efficient management of waste and utility services can affect profitability of a service provider and satisfaction of a customer. The disclosed system, method, and app may allow for the services of multiple different providers to be easily managed via a single app. This may include, among other things, service monitoring, consumption tracking, data recording, accounting, billing, and service adjusting. For example, the disclosed system, method, and app may provide a graphical user interface (GUI) allowing data from any number of utility meters at a customer location to be locally transmitted to a waste service vehicle, while the waste service vehicle is performing waste-relate services at the property. This information may then be used to create a single invoice for the customer for the utility and waste services. The customer may then pay once for all of the services, and the disclosed app may distribute the payment to each corresponding utility provider. In addition, the disclosed system, method, and app may be able to make automated adjustments to utility consumption (e.g., changes to heating and/or lighting levels) at the property (e.g., based on trend analysis). The GUI of the disclosed app may also allow the operator (and/or the customer) to view the location of service vehicle 12 relative to the customer location, as well as summary and/or control information regarding the waste and utility services. The GUI provided by the disclosed app may also relay to the operator visual directions to the customer location, provide visual status indicators associated with waste and/or utility services, and provide a way for the operator to give feedback or other input regarding service activities, the customer location, service vehicle 12, etc. The disclosed method will now be explained in detail with reference to FIG. 3.

As seen in FIG. 3, the method implemented by controller 18 may begin at startup of service vehicle 12 (e.g., at start of a service route, a work shift, when prompted by the operator, or in response to another triggering condition). Controller 18 may then determine and display a route of customer locations that the operator should service during the work shift (Step 305). In some instances, the route may be determined automatically by controller 18, for example based on an identification of service vehicle 12, an identification of the operator, a day of the week, or another similar factor. In other instances, the route may be manually selected (e.g., by the operator and/or a supervisor) from among a plurality of available routes. Display of the route may include, among other things, a listing of the customer locations, directions to the customer locations, a map of the customer locations, service (e.g., waste and/or utility) information about each customer location, and/or a schedule of when each customer location should be serviced.

After receiving the route (e.g., as electronic data stored inside input device 24), the operator may drive service vehicle 12 toward a customer location listed first in the route. During this travel, controller 18 may track the location of service vehicle 12 (Step 310), and compare the location to a known position of the customer location. Specifically, controller 18 may determine if service vehicle 12 is within a threshold proximity of the customer location (Step 315). For example, based on a comparison of a GPS location of service vehicle 12 with known coordinates of the customer location, controller 18 may determine that service vehicle 12 is close enough to the customer location for performance of the required service. In another example, based on detection (e.g., a strength and/or identification) of a wireless signal broadcast from offboard communication device 28*a* at the customer location, controller 18 may be able to determine that service vehicle 12 is adequately close to the customer location. In yet another example, controller 18 may rely on both the GPS location and the wireless signal as input to the determination made at Step 315. When controller 18 determines that service vehicle 12 is not within the threshold proximity to the customer location (Step 315: N), control may loop back to Step 310.

However, when controller 18 determines that service vehicle 12 is close enough to the customer location for performance of the required service at the customer location (Step 315: Y), controller 18 may begin monitoring performance of the required waste-related service (Step 320). This may include monitoring movement of receptacle 14, monitoring lifting, tilting, dumping, and/or compressing by service vehicle 12, monitoring movement of the operator, etc. This monitoring may be completed via input device 24 (e.g., based on operator input that a service has been completed), based on input from one or more sensors (not shown), based on the tracked location of service vehicle 12 (e.g., based on service vehicle 12 being stopped at a customer location for an expected period of time), etc.

At about the same time as completing Step 320, controller 18 may determine if the customer being serviced is also registered for utility management services (Step 325). This determination may be made in any number of ways. For example, controller 18 may reference the location of the customer with a database of subscribing customers to determine that the customer, in addition to receiving waste-related services, also desires to have other utility services managed by the same provider. In another example, controller 18 may detect a signal from offboard communication device 28*a* indicative of a request for such management. Other methods may also be utilized.

If controller 18 determines at Step 325 that the customer currently receiving waste services is not also registered for utility management services (Step 325: N), controller 18 may update a waste-related customer account, generate an invoice for only the waste services, and receive electronic payment for the waste services in a conventional manner (Step 330). Control may return from Step 330 to Step 305.

However, when controller determines at Step 325 that the customer is registered for utility management services (Step 325: Y), controller 18 may communicate with utility meters 26 (e.g., via communication devices 28*a* and 28*b*). In particular, controller 18 may receive input from utility meters 26 positioned at the customer location (Step 345). This input may include, among other things, a consumption usage amount, rate, and/or history; a consumption setting; an amount remaining of a particular necessity; etc.

In some embodiments, controller 18 (and/or controller 32 at back office 34) may be configured to analyze the information received from utility meters 26. For example, controller 18 may be configured to determine an occupancy status and/or trend at the customer location (Step 340). In particular, controller 18 may be configured to determine if the customer is on vacation (or otherwise away from the location) for an extended period of time based on a consumption rate, a consumption setting, etc. For example, if a heat setting at the location has been set to vacation mode or a water consumption rate is low (e.g., relative to a normal consumption rate), controller 18 may determine that one or more individuals are away from the customer location. Likewise, if the electricity usage or amount of waste in receptacle 14 is abnormally high, controller 18 may determine that guests are staying at the customer location.

Controller 18 may be configured to update the utility companies providing services to the customer location with the information received from utility meters 26 (along with any analysis performed), and to generate at least one invoice (e.g., a single common invoice) for the customer for the waste and utility services (Step 345). For example, controller 18 may relay current meter readings to each of the utility companies providing service at a particular customer location and, in response thereto, the utility companies may communicate back a fee associated with the readings. Controller 18 may lump together the different fees, along with an associated waste service fee, and provide to the customer a single amount that the customer is responsible for paying. Breakdowns of the different utility companies' contributions to the single amount may also be provided, if desired. The customer may then pay a one-time fee for each billing cycle for the single amount. This fee may be paid, for example, to the provider of the waste services (e.g., via the disclosed app).

It is contemplated that adjustments to utility and/or waste services may be selectively implemented at a particular customer location based on the analysis described above. For example, if usage of one necessity is lower than normal and controller 18 determines based thereon that the occupant of a particular customer location is on vacation (or otherwise away from the location), controller 18 may let all service providers of the customer location know about the status. This may allow the providers to tailor their services (e.g., to change a supply rate, to change a supply timing, to provide a refund, etc.) based on the status. Likewise, controller 18 may be configured (and provided the proper authorization and/or access by the customer) to make adjustments to control settings inside the location. For example, based on a sudden drop in waste being retrieved from a customer location (e.g., a drop that is indicative of the customer being away from the location for an extended period of time), a heating and/or lighting setting at the location may be automatically reduced (e.g., via remote communication with utility meter 26).

It may also be possible for controller 18 to selectively generate an alert (e.g., an alert directed to the customer and/or to a utility provider) based on the analysis. In particular, when consumption of a particular necessity suddenly changes by an extreme amount, it could be indicative of a problem at the customer location. For example, a sudden jump in gas or water usage could indicate a leak. In this situation, controller 18 (and/or controller 32 at back office 34) may electronically notify (e.g., via text, email, call, etc.) the customer, notify the utility provider, and/or notify local authorities of the possibility (e.g., via communication device 28). In some situations, controller 18 (and/or controller 32 at back office 34) may additionally be configured to shut off the offending service (e.g., via utility meter 26).

Controller 18 (and/or controller 32 at back office 34) may electronically receive payment for the invoice generated at Step 345 (or at least receive electronic notification that the invoice was paid, for example via a check or cash at back office 34), and responsively distribute corresponding portions of the fee to each of the different utility companies on behalf of the customer (Step 350). Control may return from Step 350 to Step 305.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing services at a customer location, comprising:
   a wireless transmitter/receiver positioned onboard a service vehicle;
   at least one utility meter positioned at a customer location offboard the service vehicle; and
   a controller in communication with at least one utility meter via the wireless transmitter/receiver;
   the controller being configured to:
      determine a location of the service vehicle within a threshold proximity of the customer location;
      receive via the wireless transmitter/receiver, a first signal from the at least one utility meter including utility consumption information associated with the customer location;
      generate an analysis of the utility consumption information received from the at least one utility meter;
      determine, based on the analysis, at least one of an occupancy status and a utility usage trend at the customer location; and
      based on the determined occupancy status or utility usage trend, automatically transmit a second signal causing a selective adjustment to a utility service, a utility setting, or a waste service at the customer location.

2. The system of claim 1, wherein utility consumption information comprises at least one of a utility consumption amount or rate; a historical consumption amount or rate; a consumption setting; and an amount remaining of a particular necessity.

3. The system of claim 2, wherein the analysis includes a comparison of a current consumption amount or rate with a historical consumption amount or rate.

4. The system of claim 3, wherein the controller is further configured to selectively generate an alert directed to at least one of a customer associated with the customer location, a utility provider associated with the at least one utility meter, and local authorities based on the analysis.

5. The system of claim 3, wherein the second signal causes the at least one utility meter to shut off the associated utility in response to determining that consumption of a particular necessity suddenly changes by an extreme amount indicative of a problem at the customer location.

6. The system of claim 1, wherein the controller is positioned onboard the waste service vehicle.

7. The system of claim 1, further including a locating device positioned onboard the service vehicle configured to generate a third signal indicative of the location of the service vehicle, wherein the controller is configured to communicate with the at least one utility meter only when the service vehicle is within the threshold proximity of the customer location.

8. The system of claim 1, wherein the at least one utility meter includes a plurality of utility meters associated with a plurality of utility services or current utility settings.

9. The system of claim 8, wherein:
   the determination of an occupancy status or utility usage trend is based on the analysis of the utility consumption information received from a first utility meter; and
   the second signal causes a selective adjustment to a different utility service, utility setting, or waste service at the customer location.

10. The system of claim 1, further including an input device, wherein the controller is further configured to receive input from an operator of the service vehicle via the input device regarding a waste service activity at the customer location.

11. A method for managing services at a customer location, comprising:
   determining, at a controller, a location of a service vehicle within a threshold proximity of the customer location;
   receiving, from at least one utility meter via a wireless transmitter/receiver, a first signal including utility consumption information associated with the customer location;
   generating an analysis of the utility consumption information received from the at least one utility meter;
   determining, based on the analysis, at least one of an occupancy status and a utility usage trend at the customer location; and
   based on the determined occupancy status or utility usage trend, automatically transmitting a second signal causing a selective adjustment to a utility service, a utility setting, or a waste service at the customer location.

12. The method of claim 11, wherein the utility consumption information comprises at least one of a utility consumption amount or rate; a historical consumption amount or rate; a consumption setting; and an amount remaining of a particular necessity.

13. The method of claim 12, wherein the analysis includes a comparison of a current consumption amount or rate with a historical consumption amount or rate.

14. The method of claim 13, further including selectively generating an alert directed to at least one of a customer associated with the customer location, a utility provider associated with the at least one utility meter, and local authorities based on the analysis.

15. The method of claim 13, wherein the second signal causes the at least one utility meter to shut off the associated utility in response to determining that consumption of a particular necessity suddenly changes by an extreme amount indicative of a problem at the customer location.

16. The method of claim 11, wherein the at least one utility meter includes a plurality of utility meters associated with a plurality of utility services or current utility settings.

17. The method of claim 16, wherein the determination of an occupancy status or utility usage trend is based on the analysis of the utility consumption information received from a first utility meter; and
   the second signal causes a selective adjustment to a different utility service, utility setting, or waste service at the customer location.

18. A non-transitory computer readable medium containing computer-executable programming instructions for performing a method of service management at a customer location, the method comprising:
   determining, at a controller, a location of a service vehicle within a threshold proximity of the customer location;
   receiving, from at least one utility meter via a wireless transmitter/receiver, a first signal including utility consumption information associated with the customer location;
   generating an analysis of the utility consumption information received from the at least one utility meter;

determining, based on the analysis, at least one of an occupancy status and a utility usage trend at the customer location; and based on the determined occupancy status or utility usage trend, automatically transmitting a second signal causing an selective adjustment to a utility service, a utility setting, or a waste service at the customer location.

19. The non-transitory computer readable medium of claim 18, wherein the utility consumption information comprises at least one of a utility consumption amount or rate; a historical consumption amount or rate; a consumption setting; and an amount remaining of a particular necessity.

20. The non-transitory computer readable medium of claim 18, wherein:

the determination of an occupancy status or utility usage trend is based on the analysis of the utility consumption information received from a first utility meter; and the second signal causes a selective adjustment to a different utility service, utility setting, or waste service at the customer location.

* * * * *

UNITED STATES PATENT AND TRADEMARK OFFICE
CERTIFICATE OF CORRECTION

| | |
|---|---|
| PATENT NO. | : 11,574,289 B2 |
| APPLICATION NO. | : 17/081896 |
| DATED | : February 7, 2023 |
| INVENTOR(S) | : Philip Rodoni |

It is certified that error appears in the above-identified patent and that said Letters Patent is hereby corrected as shown below:

In the Claims

Column 9, Line 53, replace "positioned onboard the waste service vehicle." with -- positioned onboard the service vehicle. --.

Signed and Sealed this
Twelfth Day of September, 2023

Katherine Kelly Vidal
*Director of the United States Patent and Trademark Office*